US008950035B2

(12) United States Patent
Benner et al.

(10) Patent No.: US 8,950,035 B2
(45) Date of Patent: Feb. 10, 2015

(54) WIPER BLADE OF FLAT BEAM CONSTRUCTION

(75) Inventors: Andreas Benner, Taipei (TW); Klaus-Juergen Westermann, Bad Herrenalb (DE); Ursula Westermann, legal representative, Bad Herrenalb (DE)

(73) Assignee: Robert Bosch GmbH, Stuttgart (DE)

( * ) Notice: Subject to any disclaimer, the term of this patent is extended or adjusted under 35 U.S.C. 154(b) by 299 days.

(21) Appl. No.: 13/510,452

(22) PCT Filed: Oct. 18, 2010

(86) PCT No.: PCT/EP2010/065583
§ 371 (c)(1),
(2), (4) Date: Sep. 5, 2012

(87) PCT Pub. No.: WO2011/061023
PCT Pub. Date: May 26, 2011

(65) Prior Publication Data
US 2012/0317741 A1 Dec. 20, 2012

(30) Foreign Application Priority Data
Nov. 17, 2009 (DE) .......................... 10 2009 046 776

(51) Int. Cl.
B60S 1/40 (2006.01)
B60S 1/38 (2006.01)

(52) U.S. Cl.
CPC ............... *B60S 1/3858* (2013.01); *B60S 1/387* (2013.01)
USPC ............... 15/250.32; 15/250.43; 15/250.361; 15/250.44; 15/250.201

(58) Field of Classification Search
CPC ......... B60S 1/40; B60S 1/3849; B60S 1/3858
USPC ............ 15/250.32, 250.43, 250.361, 250.44, 15/250.201
See application file for complete search history.

(56) References Cited

U.S. PATENT DOCUMENTS 4,967,437 A 11/1990 Morse
7,587,783 B1 * 9/2009 Lin ........................... 15/250.43
(Continued)

FOREIGN PATENT DOCUMENTS

EP 1564094 8/2005
JP 2008254695 10/2008
(Continued)

OTHER PUBLICATIONS

PCT/EP2010/065583 International Search Report dated Dec. 21, 2010 (Translation and Original, 4 pages).

*Primary Examiner* — Monica Carter
*Assistant Examiner* — Michael Jennings
(74) *Attorney, Agent, or Firm* — Michael Best & Friedrich LLP

(57) ABSTRACT

The invention is based on a wiper blade (10) of flat beam construction having a support element in the form of at least one pre-bent spring rail (16) to which is fastened, in the central region, a connecting element (20) for articulatedly connecting to a wiper arm, wherein the connecting element (20) has two side walls (22) with open guide profiles (28), facing toward one another, for the spring rail (16), the side walls (22) are connected to one another by means of transversely running parts (24), and the connecting element (20) is fixed relative to the spring rail (16) in the longitudinal direction by means of a fixing element (40), wherein the fixing element (40) engages into cutouts (34) on the outer longitudinal sides of the spring rail (16). It is proposed that the fixing element (40) has a U-shaped cross-sectional profile with two side walls (42) which are connected to one another by means of a base (44) and which are sunk into recesses (30) on the inner sides of the side walls (22) of the connecting element (20), wherein the base (44) of the fixing element (40) runs parallel to the base (24) of the connecting element (20), and lugs (52) are connected to the side walls (42) of the fixing element (40) as an elongation of the side walls (42) toward the spring rail (16), which lugs (52) engage into the cutouts (34) of the spring rail (16) through openings (38) in the base (24) of the connecting element (20).

19 Claims, 2 Drawing Sheets

(56) References Cited

U.S. PATENT DOCUMENTS

| | | | |
|---|---|---|---|
| 8,191,200 B2* | 6/2012 | Kim | 15/250.32 |
| 2007/0113366 A1* | 5/2007 | Walworth et al. | 15/250.32 |
| 2008/0289133 A1* | 11/2008 | Kim | 15/250.32 |
| 2009/0113653 A1* | 5/2009 | Thienard | 15/250.32 |
| 2011/0099743 A1* | 5/2011 | Chiang | 15/250.32 |

FOREIGN PATENT DOCUMENTS

| | | | |
|---|---|---|---|
| WO | 02/42129 | 5/2002 | |
| WO | WO 2008003675 A1 * | 1/2008 | ............... B60S 1/40 |
| WO | 2008069464 | 6/2008 | |
| WO | WO 2009071372 A1 * | 6/2009 | |

* cited by examiner

WIPER BLADE OF FLAT BEAM CONSTRUCTION

BACKGROUND OF THE INVENTION

The invention proceeds from a wiper blade of flat beam construction.

DE 100 58 208 A1 has disclosed a wiper blade of the generic type, in which a connection element made from a suitable material, for example from plastic, is fastened in the central region on two spring bars which run in parallel and serve as a carrying element. On the longitudinal sides, the connection element has guide profiles, by way of which it clasps the spring bars from the outer longitudinal sides at the top and bottom, and on the longitudinal sides themselves. Between the two spring bars, there is a fixing element which is supported on the connecting element and fixes the spring bars in a positive and/or nonpositive manner. A pin is provided as fixing element, which pin is guided approximately perpendicularly with respect to the lateral side of the spring bars in a hole of the connection element and presses the spring bars nonpositively to the outside against the guide profiles of the connection element. In some refinements, the pin can also engage into cutouts on the inner sides of the spring bars, as a result of which a positive connection is achieved in addition to or instead of the nonpositive connection. In addition, the positive connection can be reinforced by the fact that cutouts are likewise provided on the outer sides of the spring bars, into which cutouts projections engage in the region of the guide profile. During mounting in its guide, the fixing pin is secured in its axial position, for example by a press fit, by adhesive bonding, brazing, welding, calking, pressing, screwing or the like.

SUMMARY OF THE INVENTION

According to the invention, the fixing element has a U-shaped cross-sectional profile with two side walls which are connected to one another by a base and are let into recesses on the inner sides of the side walls of the connection element, the base of the fixing element running parallel to the base of the connection element, and tongues being connected to the side walls in an extension of the side walls of the fixing element toward the spring bar, which tongues engage into the cutouts of the spring bar through openings in the base of the connection element.

The wiper blade according to the invention with the connection element and its fixing element forms a simple plug-in system, in which the mounting can be carried out by simple manual maneuvers in a short time. Furthermore, the risk of faulty mounting operations is lowered by the simplified mounting. The fixing element itself is a dimensionally stable component which transmits the forces which act on it to the connection element over a large surface area and without play. The surface pressures which are relevant for the wear are very low. It can therefore take over further functions; for example, it can receive bearing elements for the articulated connection to a wiper arm. To this end, in its side walls, the fixing element advantageously has holes which serve as a hub or to receive a pivot pin. If the pivot pin is riveted into the side walls of the fixing element, the connection element has cutouts in the region of the outwardly projecting rivet heads, into which cutouts the rivet heads engage during the mounting. In order to anchor the fixing element in the connection element it is clipped virtually without play into the recesses of the connection element or is inserted from open sides of the recess which lies facing away from the wiping strip, and is latched by latching lugs in the recesses of the side walls, which latching lugs latch into latching openings of the side walls of the fixing element during the mounting.

In principle, the connection element and the fixing element can be produced from plastic. However, the fixing element is expediently manufactured from metal, in order to achieve greater strength, stability and service life. As a result, satisfactory lateral guidance and high wiping quality are ensured over the service life of the wiper blade. In an advantageous way, the fixing element made from metal is combined with a connection element made from plastic.

Here, the fixing element is expediently a sheet-metal bent part, the tongues being notched out of the base and being bent into the planes of the side walls. Here, an aperture which corresponds to the notched tongues is produced in the base of the fixing element.

The present invention does not only comprise the wiper blade in its entirety, but rather also the essential components, namely the connection element and the fixing element.

BRIEF DESCRIPTION OF THE DRAWINGS

Further advantages result from the following description of the figures. One exemplary embodiment of the invention is shown in the drawing. The drawing, the description and the claims contain numerous features in combination. A person skilled in the art will expediently also consider the features individually and combine them to form appropriate further combinations.

In the drawing.

DETAILED DESCRIPTION

Figure 1:
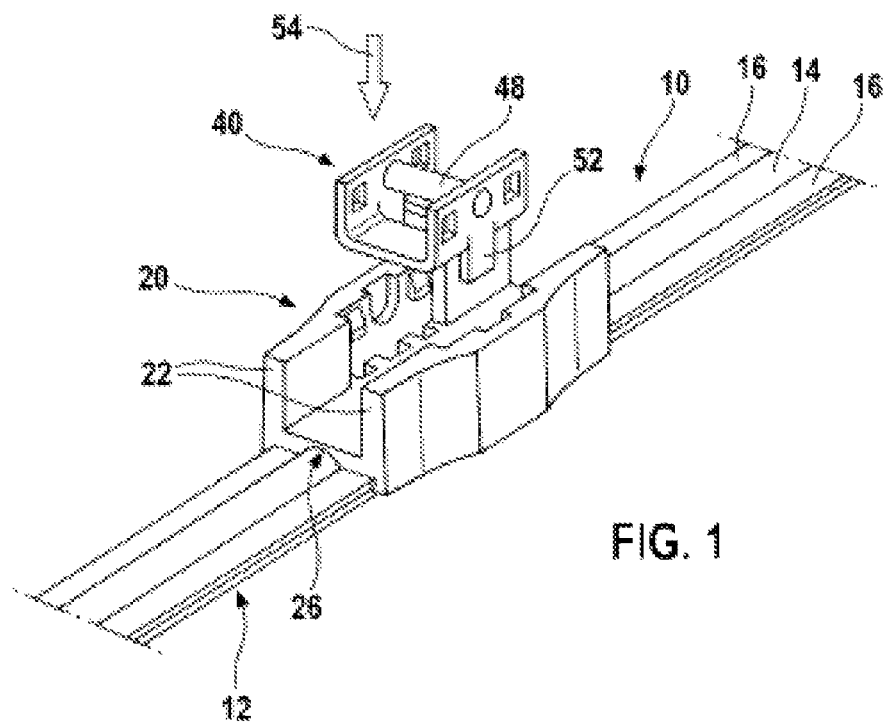
FIG. 1 shows a perspective part view of a wiper blade according to the invention with a connection element during the mounting of a fixing element.
Figure 2:
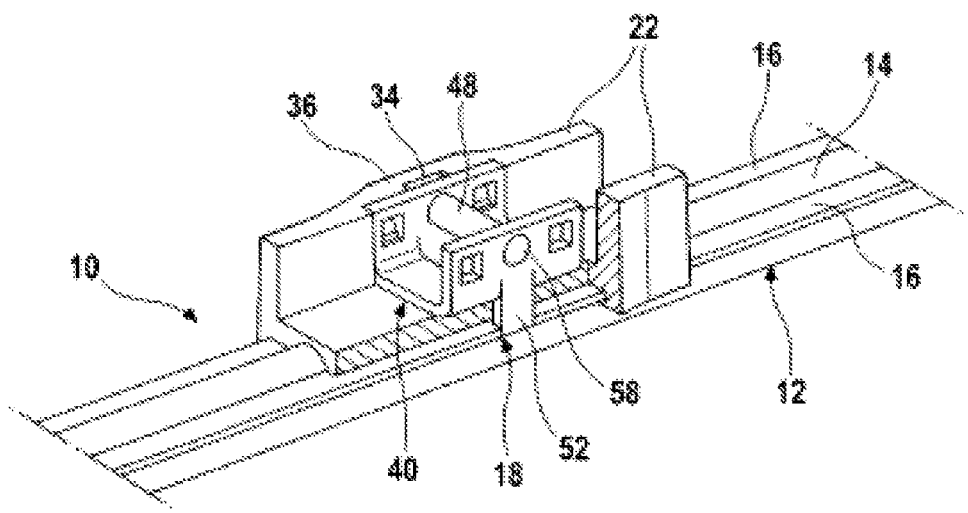
FIG. 2 shows a perspective, partially sectioned part view of a wiper blade according to FIG. 1 with a mounted fixing element.
Figure 3:
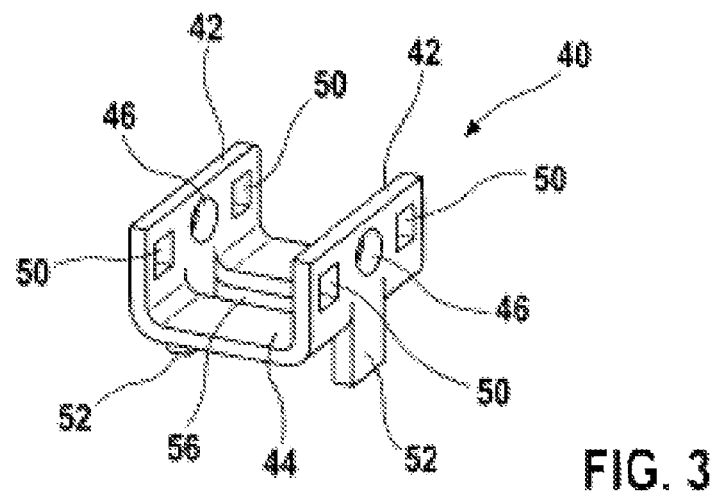
FIG. 3 shows a perspective view of a fixing element.
Figure 4:
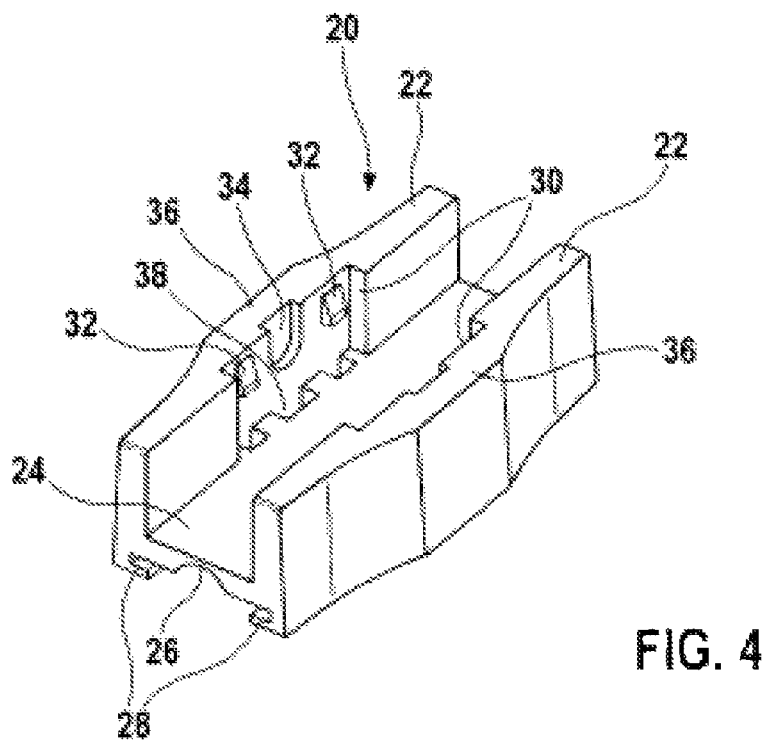
FIG. 4 shows a perspective view of a connection element.

A wiper blade 10 substantially has a wiper strip 12, the rear strip 14 of which is held by two spring bars 16 which engage as a carrying element below the rear strip 14 into longitudinal grooves (not shown in greater detail) of the wiper strip 12. Solutions are also possible with a spring bar 16 which as a rule is accommodated in a longitudinal channel of the wiper strip 12. A connection element 20 which serves for the articulated connection of the wiper blade 10 to a wiper arm (not shown) is fastened on the spring bars 16 in the central region of the wiper blade 10.

The connection element 20 has two side walls 22 which have guide profiles 28 toward the spring bars 16. In the mounted state, they clasp the spring bars 16 laterally from below and from above. The two side walls 22 of the connection element 20 are connected to one another above the guide profiles 28 by a base 24. Toward the wiper strip 12, said base 24 has a longitudinal groove 26 which affords sufficient space for the rear strip 14.

Recesses 30 are provided on the inner sides of the side walls 22 of the connection element 20, which recesses 30 are open toward the side which faces away from the wiper strip 12, and which recesses 30 have latching lugs 32 on their inner sides. During the mounting, a fixing element 40 is inserted in the mounting direction 54 from the open sides of the recesses 30, the side walls 42 of which fixing element 40 are connected to one another by a base 44. The side walls 42 are guided virtually without play in the recesses 30 of the connection element 20. Tongues 52 are integrally formed on the side walls 42 in an extension of the side walls 42 toward the spring bars 16, which tongues 52 are guided through openings 38 in the base 24 of the connection element 20 and engage into cutouts 18 which are arranged so as to lie opposite one another on the outer sides of the spring bars 16. The mounting position of the connection element 20 is defined by the cutouts 18. It is possible here that a plurality of cutouts 18 are provided offset in the longitudinal direction so that, in the case of the same wiper blade 10, different mounting positions of the connection element 20 are possible depending on the application. In order to ensure the stability of the side walls 22 in the region of the recesses 30, the side walls 22 are reinforced in this region by thickened portions 36.

In its side walls, the fixing element 40 has latching openings 50 which interact with the latching lugs 32 in the recesses 30 of the side walls 22 of the connection element 20, with the result that the fixing element 40 is latched with the connection element 20 in the mounted position. The connection element 20 is therefore fixed by the guide profiles 28 in the direction of a vertical axis and transversely with respect to the longitudinal direction of the wiper blade 10, whereas the fixing element 40 assumes the securing of the connection element 20 in the longitudinal direction of the wiper blade 10.

The fixing element 40 can assume further functions; for example, it can receive bearing elements for the articulated connection to the wiper arm. To this end, the fixing element 40 has holes 46 in its side walls 42, which holes 46 can serve as hubs for an articulated connection or in which holes 46 a pivot pin 48 is fastened. The latter is expediently riveted to the side walls 42, the outwardly projecting rivet heads 58 finding space in cutouts 34 of the recesses 30 of the connection element 20.

In principle, the fixing element 40 can be composed of any desired suitable material. For strength reasons, production reasons and stability reasons, it is expedient that the fixing element 40 is a metal part. Here, it can be a sheet-metal part, a Zamac part, a die-cast magnesium part or a wire structure. The sheet-metal part is expediently produced in a stamping/bending process, the tongues being notched from the base and being bent into the planes of the side walls 42. The aperture which is produced as a result in the base 44 is denoted by 56.

The invention claimed is:

1. A wiper blade (10) of flat beam construction having a carrying element in the form of at least one prebent spring bar (16), to which a connection element (20) is fastened in a central region for articulated connection to a wiper arm, the connection element (20) having two side walls (22) with open guide profiles (28) which face one another for receiving the spring bar (16), the side walls (22) being connected to one another by a transversely running base (24), the side walls (22) extending above the base (24) in a direction away from the spring bar (16), and the connection element (20) being fixed by a fixing element (40) in a longitudinal direction relative to the spring bar (16), the fixing element (40) being received between the side walls (22) of the connection element (20) above the base (24), the fixing element (40) engaging into cutouts (34) on outer longitudinal sides of the spring bar (16), characterized in that the fixing element (40) has a U-shaped cross-sectional profile with two side walls (42) which are connected to one another by a base (44) and extend into recesses (30) on inner sides of the side walls (22) of the connection element (20) above the base (24) of the connection element (20), the base (44) of the fixing element (40) running parallel to the base (24) of the connection element (20), and tongues (52) being connected to the side walls (42) in an extension the side walls (42) of the fixing element (40) toward the spring bar (16), which tongues (52) engage into the cutouts (34) of the spring bar (16) through openings (38) in the base (24) of the connection element (20).

2. The wiper blade (10) as claimed in claim 1, characterized in that the tongues (52) are formed integrally on the side walls (42) of the fixing element (40).

3. The wiper blade (10) as claimed in claim 2, characterized in that the side walls (42) of the fixing element (40) have holes (46) which serve as a hub or to receive a pivot pin (48).

4. The wiper blade (10) as claimed in claim 3, characterized in that the pivot pin (48) is riveted into the side walls (42) of the fixing element (40) and outwardly projecting rivet heads engage into cutouts (34) in the recesses (30) of the connection element (20).

5. The wiper blade (10) as claimed in claim 4, characterized in that latching openings (50) are provided in the side walls (42) of the fixing element (40), which latching openings (50) interact with latching lugs (32) in the recesses (30) of the side walls (22) of the connection element (20).

6. The wiper blade (10) as claimed in claim 5, characterized in that the fixing element is manufactured from metal.

7. The wiper blade (10) as claimed in claim 6, characterized in that the fixing element (40) is a sheet-metal bent part, the tongues (52) being notched out of the base (44) and being bent into planes of the side walls (42).

8. The wiper blade (10) as claimed in claim 7, characterized in that a plurality of cutouts (18) which define different fixing points of the connection element (20) are arranged offset in the longitudinal direction with respect to one another on the outer longitudinal sides of the spring bar (16).

9. The wiper blade (10) as claimed in claim 1, characterized in that the side walls (42) of the fixing element (40) have holes (46) which serve as a hub or to receive a pivot pin (48).

10. The wiper blade (10) as claimed in claim 1, characterized in that latching openings (50) are provided in the side walls (42) of the fixing element (40), which latching openings (50) interact with latching lugs (32) in the recesses (30) of the side walls (22) of the connection element (20).

11. The wiper blade (10) as claimed in claim 1, characterized in that the fixing element is manufactured from metal.

12. The wiper blade (10) as claimed in claim 11, characterized in that the fixing element (40) is a sheet-metal bent part, the tongues (52) being notched out of the base (44) and being bent into planes of the side walls (42).

13. The wiper blade (10) as claimed in claim 1, characterized in that a plurality of cutouts (18) which define different fixing points of the connection element (20) are arranged offset in the longitudinal direction with respect to one another on the outer longitudinal sides of the spring bar (16).

14. The wiper blade (10) as claimed in claim 1, characterized in that the tongues (52) extend below the base (44) and below a lower end of the side walls (42) of the fixing element (40).

15. The wiper blade (10) as claimed in claim 1, characterized in that an upper edge of the connection element (20) is aligned with an upper end of the fixing element (40).

16. The wiper blade (10) as claimed in claim 1, characterized in that a pivot pin (48) is supported by the side walls (42) of the fixing element (40), and characterized in that the pivot pin (48) is between the side walls (22) of the connection element (20).

17. A wiper blade (10) of flat beam construction having a carrying element in the form of at least one prebent spring bar (16), to which a connection element (20) is fastened in a central region for articulated connection to a wiper arm, the connection element (20) having two side walls (22) with open guide profiles (28) which face one another for receiving the spring bar (16), the side walls (22) being connected to one another by a transversely running base (24), and the connection element (20) being fixed by a fixing element (40) in a longitudinal direction relative to the spring bar (16), the fixing element (40) engaging into cutouts (34) on outer longitudinal sides of the spring bar (16), wherein the fixing element (40) has a U-shaped cross-sectional profile with two side walls (42) which are connected to one another by a base (44) and extend into recesses (30) on inner sides of the side walls (22) of the connection element (20), the base (44) of the fixing element (40) running parallel to the base (24) of the connection element (20), and tongues (52) being connected to the side walls (42) in an extension of the side walls (42) of the fixing element (40) toward the spring bar (16), which tongues (52) engage into the cutouts (34) of the spring bar (16) through openings (38) in the base (24) of the connection element (20), wherein the side walls (42) of the fixing element (40) have holes (46) which serve as a hub or to receive a pivot pin (48), and wherein the pivot pin (48) is riveted into the side walls (42) of the fixing element (40) and outwardly projecting rivet heads engage into cutouts (34) in the recesses (30) of the connection element (20).

18. A connection element (20) for use in a wiper blade (10) of flat beam construction having a carrying element in the form of at least one prebent spring bar (16), to which the connection element (20) is fastened in a central region for articulated connection to a wiper arm, the connection element (20) having two side walls (22) with open guide profiles (28) which face one another for receiving the spring bar (16), the side walls (22) being connected to one another by a transversely running base (24), the connection element (20) having a U-shaped cross-sectional profile with the side walls (22) extending above the base (24) in a direction away from the spring bar (16), and the connection element (20) being fixed by a fixing element (40) in a longitudinal direction relative to the spring bar (16), the fixing element (40) engaging into cutouts (34) on outer longitudinal sides of the spring bar (16), wherein the fixing element (40) has a U-shaped cross-sectional profile facing in a direction of the U-shaped cross-sectional profile of the connection element (20) and with two side walls (42) which are connected to one another by a base (44) and extend into recesses (30) on inner sides of the side walls (22) of the connection element (20) above the base (24) of the connection element (20), the base (44) of the fixing element (40) running parallel to the base (24) of the connection element (20), and tongues (52) being connected to the side walls (42) in an extension of the side walls (42) of the fixing element (40) toward the spring bar (16), which tongues (52) engage into the cutouts (34) of the spring bar (16) through openings (38) in the base (24) of the connection element (20).

19. A fixing element (40) for use in a wiper blade (10) of flat beam construction having a carrying element in the form of at least one prebent spring bar (16), to which the connection element (20) is fastened in a central region for articulated connection to a wiper arm, the connection element (20) having two side walls (22) with open guide profiles (28) which face one another for receiving the spring bar (16), the side walls (22) being connected to one another by a transversely running base (24), the connection element (20) having a U-shaped cross-sectional profile with the side walls (22) extending above the base (24) in a direction away from the spring bar (16), and the connection element (20) being fixed by a fixing element (40) in a longitudinal direction relative to the spring bar (16), the fixing element (40) engaging into cutouts (34) on outer longitudinal sides of the spring bar (16), wherein the fixing element (40) has a U-shaped cross-sectional profile facing in a direction of the U-shaped cross-sectional profile of the connection element (20) and with two side walls (42) which are connected to one another by a base (44) and extend into recesses (30) on inner sides of the side walls (22) of the connection element (20), the base (44) of the fixing element (40) running parallel to the base (24) of the connection element (20), and tongues (52) being connected to the side walls (42) in an extension of the side walls (42) of the fixing element (40) toward the spring bar (16) and below the base (44) and below a lower end of the side walls (42) of the fixing element (40), which tongues (52) can engage into the cutouts (34) of the spring bar (16) through openings (38) in the base (24) of the connection element (20).

* * * * *